INVENTORS
FORD L. JOHNSON
& FRED M. MAYES
BY
ATTORNEYS

INVENTORS
FORD L. JOHNSON
& FRED M. MAYES
BY
ATTORNEYS

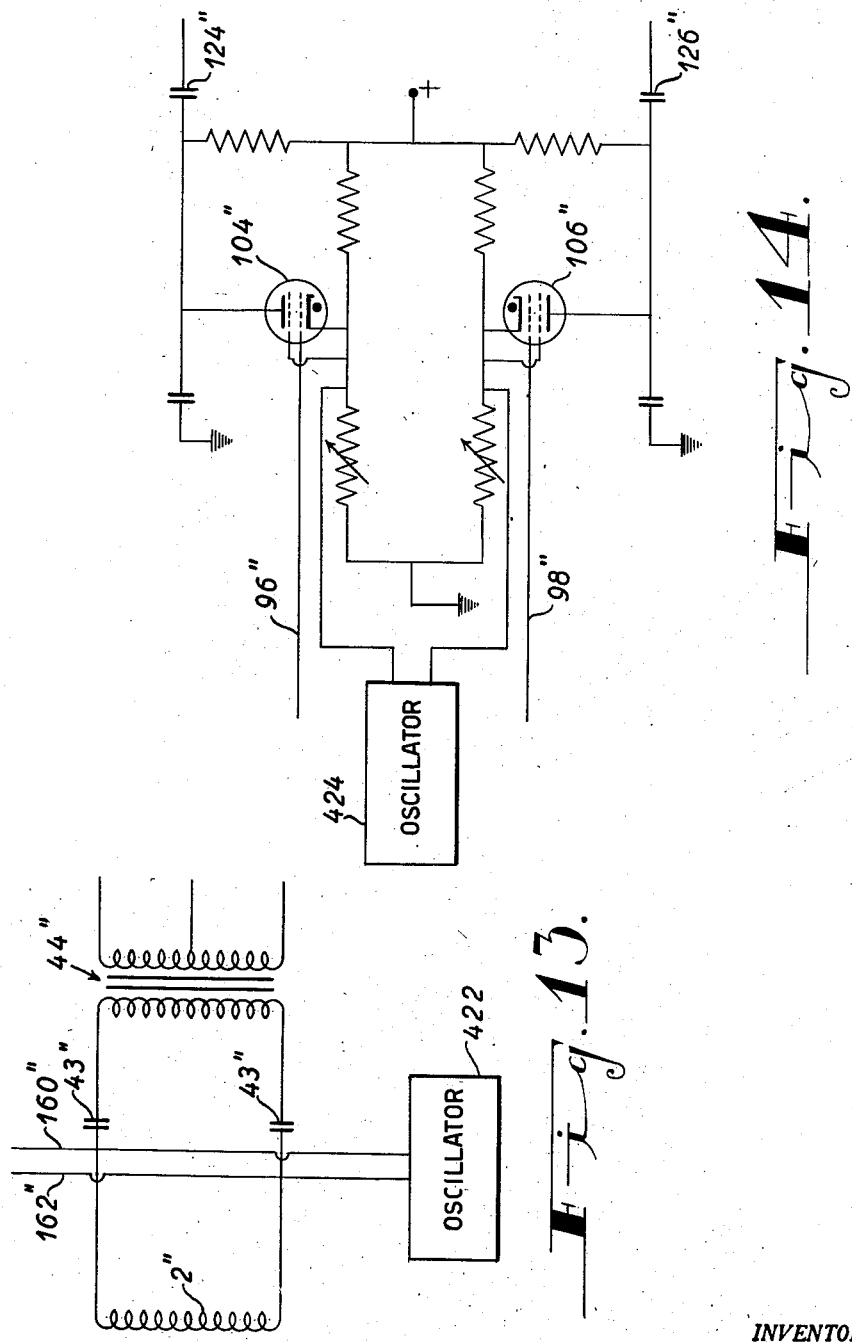

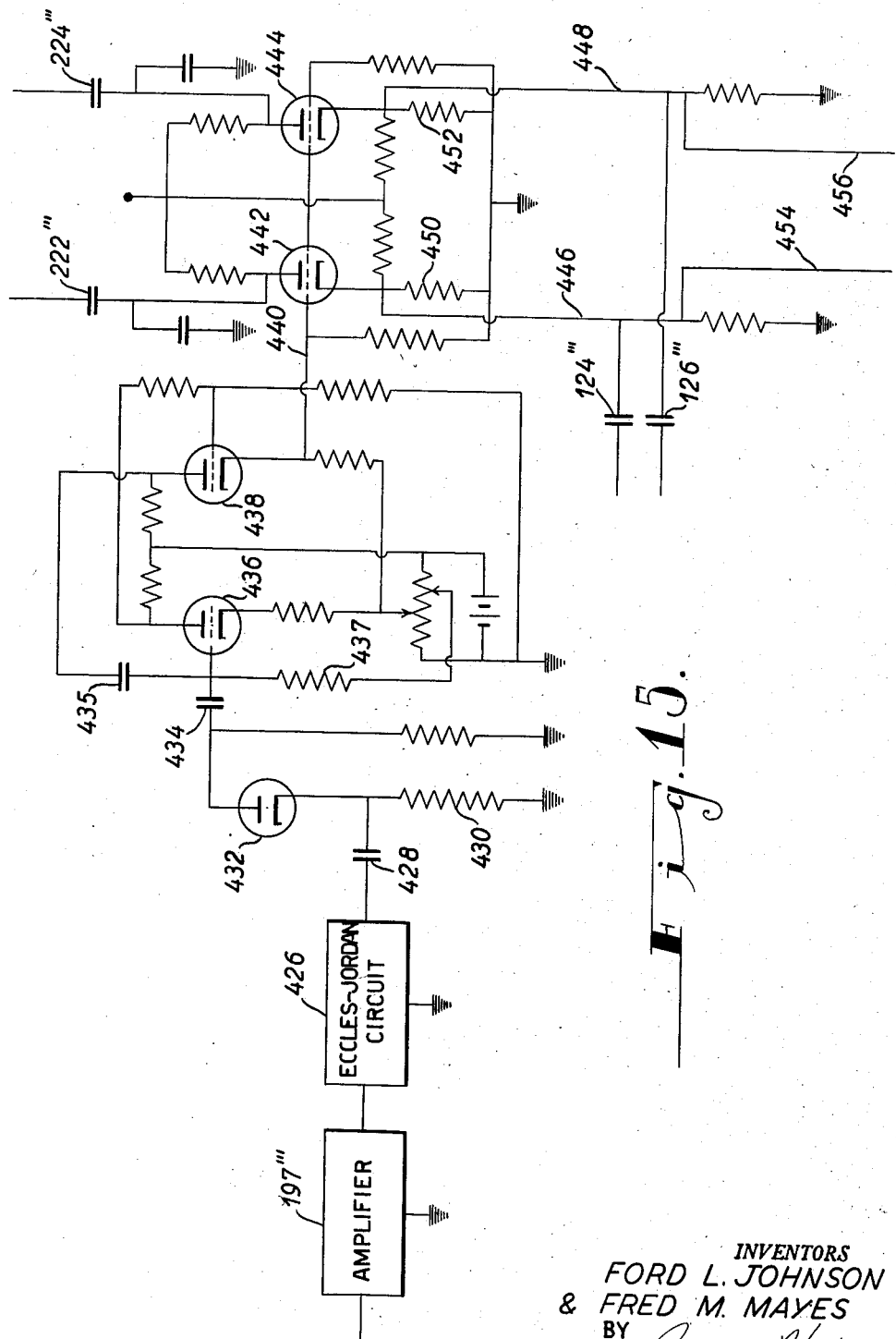

Patented Aug. 4, 1953

2,647,323

UNITED STATES PATENT OFFICE 2,647,323

ELEVATION METER

Ford Lawrence Johnson and Fred M. Mayes, Ridley Park, Pa., assignors to Sun Oil Company, Philadelphia, Pa., a corporation of New Jersey Application September 26, 1947, Serial No. 776,250

30 Claims. (Cl. 33—141.5)

This invention relates in its more specific aspects to a meter which will read directly the difference in elevation between two points on the earth's surface when the meter is moved between the points along some surface path. More broadly, however, it involves the attainment of statistical computation of a type which will become clearer hereafter.

The measurement of difference in elevation between points on the earth's surface is not only desirable for the general purpose of plotting profiles of the earth's surface but is particularly valuable in geophysical prospecting by all of the various methods commonly employed since, in general, the results of such methods must be reduced to the location of subsurface structure with respect to measuring stations so that ultimately a true subsurface map of the formations may be produced. Heretofore, the relative positions of measuring stations had to be determined by surveying methods which were difficult to carry out and consequently costly and time consuming. In accordance with the present invention a meter carried by a road vehicle may be used to ascertain differences in elevation merely by being transported from one point to the other, the meter giving its results irrespective of the path followed between the points and to a high degree of accuracy.

The basic principle involved in this elevation meter is the determination of the difference in elevation between points by the integration between them of elementary increments of length multiplied by the sine of the inclination of the increments of length to the horizontal. The equivalent of this integration is the integration of instantaneous velocity multiplied by the instantaneous sine of the angle of inclination of the path with respect to time. In the preferred form of the invention it is the latter integral which is evaluated in the form of a close statistical approximation. As will be pointed out hereafter, this result may be accomplished in various ways but is preferably accomplished by maintaining a pendulum constantly perpendicular, at least in a statistical sense, to each element of path length. A torque proportional to the sine of inclination of the path length element, which torque is required to maintain the pendulum perpendicular to the length element, is multiplied by the increment of path length and the product is integrated as the path is traversed. The integral is corrected for velocity to give to a high degree of accuracy a continuous automatic record of the difference in elevation.

One object of the invention is the attainment of the results just indicated. In the attainment of these results certain novel procedures are followed of more general application and the apparatus and methods involved therein constitute further, and even broader, objects of the invention. In particular there is involved an improved method and apparatus for multiplication and integration which may be employed for other purposes. Furthermore, there is involved a broad principle of indirect measurement of a force applied to a displaceable body by a novel measurement of forces required for its restoration to a fixed position, particularly in a sense of statistical approximation to this end.

These objects, together with other objects relating particularly to details of apparatus and methods employed, will become apparent from the following description read in conjunction with the accompanying drawings, in which:

Figure 13 is a wiring diagram showing a further modification of Figure 1;

Figure 14 is a wiring diagram showing another modification of Figure 1; and

Figure 15 is a wiring diagram showing a reversal of operation of the system of Figure 1 to give rise to still another embodiment of the invention.

Reference will first be made to the preferred type of apparatus illustrated in Figures 1 to 10, inclusive. Before proceeding with a discussion of the theory of operation the apparatus itself will be described in detail and thereafter there will be indicated the mode of attainment of measurement of elevation differences.

Figure 1:
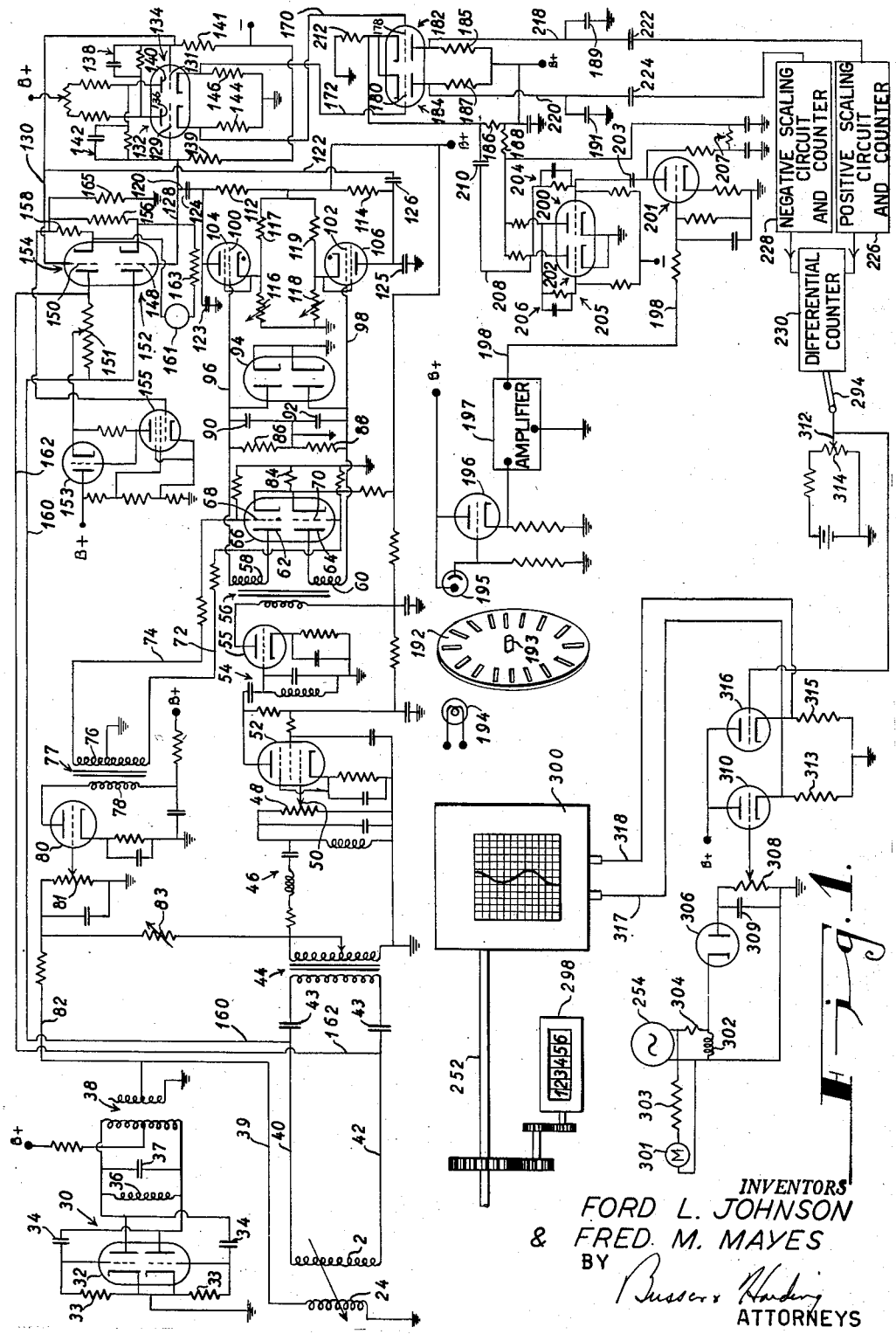
Figure 1 is a diagram illustrating the electrical connections and certain mechanical parts of a preferred embodiment of the invention.
Figure 2:
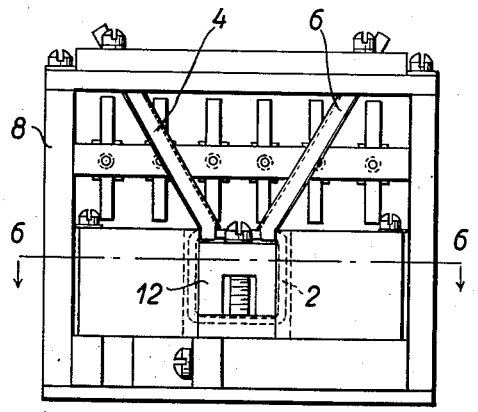
Figure 2 is an elevation of the pendulum assembly.
Figure 4:
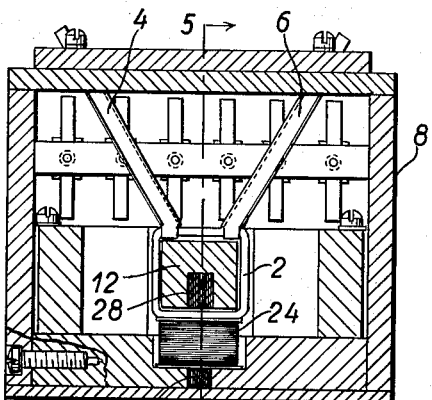
Figure 4 is a vertical section taken on the plane indicated at 4—4 in Figure 3.
Figure 3:
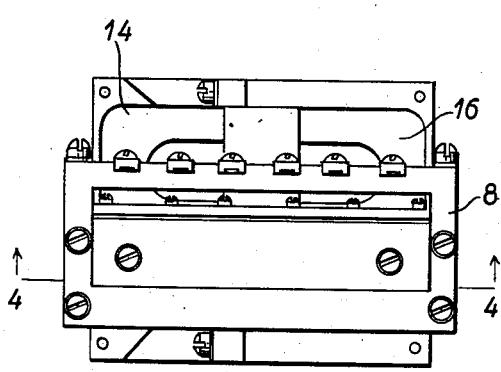
Figure 3 is a plan view of the same.
Figure 5:
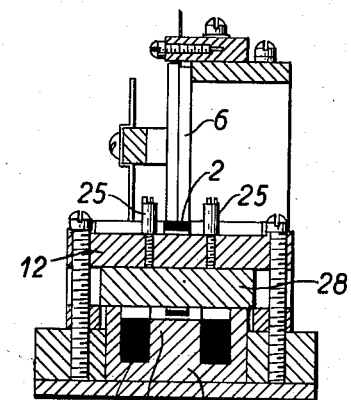
Figure 5 is a vertical section taken on the plane indicated at 5—5 in Figure 4.
Figure 6:
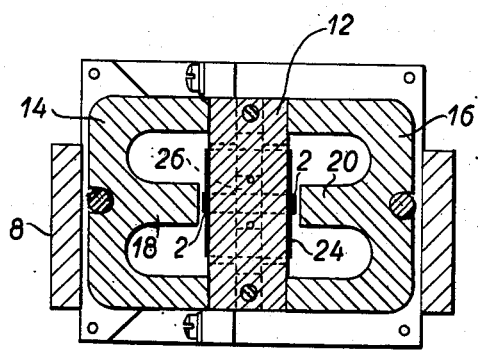
Figure 6 is a horizontal section taken on the plane indicated at 6—6 in Figure 2.

Reference will first be made to Figures 1 to 6, inclusive, involving the maintenance of a pendulum constantly perpendicular to a path of movement of the apparatus despite inclinations of that path, the maintenance of perpendicularity being in a statistical sense: i. e., the pendulum is "on the average" perpendicular to the path. In Figure 1 the pendulum assembly is diagrammed to show connections to electrical circuits. As illustrated in detail in Figures 2 to 6 the pendulum consists of a rectangular coil 2 of a large number of turns of wire supported by light spring brass strips 4 and 6 of Z or other cross-section to give rigidity, except at their upper ends where they are extended in the form of thin (0.001 inch) very flexible strips to provide fulcra of very little stiffness. These strips 4 and 6 have their flexible upper ends clamped in an insulated portion of a supporting structure 8 which is adapted to be rigidly mounted on the frame of a trailer to which reference will be made hereafter. When the trailer is on horizontal ground the pendulum will be vertical. When the trailer is on sloping ground the pendulum would, if the electrical system were not operating, also take a vertical position except to the extent to which it would be deviated therefrom due to the slight stiffness of the upper ends of the supporting strips 4 and 6. Under the operation of the electrical system, however, a magnetic torque is applied to the pendulum to cause it to assume to a high degree of accuracy a non-vertical position in which it will be perpendicular to the plane of the sloping roadway.

Rigidly fixed in the pendulum housing 8 is an iron bar 12 extending through the coil and associated with strong permanent (Alnico) magnets 14 and 16, each of E shape, to provide, between it and the central poles 18 and 20 of the magnets, an air gap, the flux across which is substantially uniform. The vertical sides of the coil 2 move in this air gap. As illustrated, the end poles of the magnets, all of which are of the same polarity and opposite the common polarity of the central poles, are in contact with the member 12.

Associated with the magnetic system just described is a second magnetic system comprising an E-shaped laminated core portion 22, the end poles of which are bridged by a laminated core section 28 which is embedded in a slot in the bar 12 and spaced from the central pole 26 of the core section 22 to provide an air gap in which moves the lower side of the rectangular pendulum coil 2. A winding 24 surrounds the pole 26 to provide an alternating flux through the laminated magnetic circuit.

The assembly just described is preferably enclosed in a container (not illustrated) filled with a damping oil for the pendulum. Adjustable stops 25 limit the pendulum movement to prevent damage thereto. The adjustment in practice may limit the pendulum swing to less than one degree.

An oscillator 30 comprises a pair of triodes indicated at 32 having their elements interconnected in conventional fashion by resistors 33 and condensers 34 to provide a multivibrator which is connected to a tuned tank consisting of inductance 36 and condenser 37. As will be evident hereafter the frequency of this oscillator is not critical inasmuch as its output, used for phase detection, is not ultimately used for its frequency value but gives rise to a direct control potential. Consistent with convenient and practical construction of the pendulum assembly the frequency of this oscillator may be of the order of five to fifteen kilocycles per second. It will, of course, be evident that the oscillator may be replaced by any of a large number of types of oscillators well known to the art.

The output from the oscillator 30 is delivered through the transformer 38 to the driver coil 24 of the pendulum assembly heretofore described. The current in the driver coil will induce in the circuit of detector coil 2 currents which will vary with the position of the detector coil. When the pendulum is in its normal midposition corresponding to perpendicularity to the roadway, the signals induced in the detector coil will be at a minimum but, as in the case of most alternating current bridge or balance arrangements, the signals will not be reduced to zero but rather will contain harmonics of the fundamental frequency and a minor component of the fundamental frequency 90° out of phase with the normal signal which would be produced with deviation of the pendulum from the perpendicularity mentioned.

The output from the detector coil is fed through the lines 40 and 42 and condensers 43 to the primary of a transformer 44, the secondary of which delivers the signals to an amplifier through a band pass filter indicated at 46. The elements of this band pass filter, for example its condensers, may be adjusted to secure the desired phase characteristics of the signals at the oscillator frequency which is used. As will be shortly evident, adjustment of the phase relationships will be helpful in securing the best responses of the detector system. The signals from the filter 46 may have their amplitudes varied by adjustment of the contact 50 of the potentiometer 48 for feed thereof to the first stage tube 52 of an amplifier which comprises an additional stage 55, coupling being provided through a circuit 54 tuned to the signal frequency. The remaining characteristics of this amplifier are quite conventional. Its output feeds the primary of a transformer 56 which has a pair of secondaries 58 and 60, corresponding ends of which are connected to the respective anodes 62 and 64 of the triode elements which may be included in a single envelope 66. The transformer connections are such that the anodes are at any instant of the same polarity. In order to render the circuit phase-sensitive, the grids 68 and 70 of the triode elements of the tube 66 are respectively connected through the lines 72 and 74 to the terminals of a secondary 76 of a transformer 77, the primary 78 of which is fed by an amplifier comprising the tube 80, the grid of which is connected through a potentiometer 81 and the line 82 with the secondary of the transformer 38. An adjustable resistor 83 connects line 82 with a center tap on the secondary of the transformer 44 to balance out-of-phase signals. Disregarding for the moment the residual signals which appear in the detector coil 2 when this coil is in its normal null position, the deviation of the pendulum coil from such position will result in the production of an induced signal voltage therein having one phase relative to the oscillator if deviation occurs in one direction and opposite phase if deviation occurs in the other direction. If it is assumed that in a particular half cycle the anodes 62 and 64 are positive and in this same half cycle the grids 68 and 70 are respectively positive and negative, then during that half cycle the triode having the anode 62 will be conductive while the triode having the anode 64 will be non-conductive. During the next half cycle, despite reversal of the grid potentials, both anodes will be negative so that neither triode will conduct.

On the other hand, if we assume a half cycle corresponding to the first one just mentioned in which grid 68 is positive and grid 70 negative, if the pendulum has deflected in the opposite direction both anodes will be negative and no current will flow in either triode. In the next half cycle both anodes will be positive and grid 70 will be positive and grid 68 negative so that the triode which includes the anode 64 will be conductive while the triode which includes the anode 62 will remain non-conductive.

Thus in a complete cycle one or the other of the triodes is conductive depending upon the direction of deviation of the pendulum from normal position. The result is pulsating current flow through one or the other of the resistances 86 and 88 and the common cathode resistor 84. The operation is essentially similar even though residual signals are delivered from the detector coil. If the amplification system is operated as a limiter, the disturbing effect of these residual signals is not detrimental and, in fact, due to the limiting action in minimizing the effects of amplitude transients the overall performance is even more satisfactory. An extreme sensitivity of detection of the pendulum position is secured. These matters will be referred to more fully hereafter.

The pulsating currents which have been referred to build up charges on the condensers 90 and 92 to give rise to negative potentials with respect to ground in the lines 96 and 98 depending upon respective conductivity through anodes 62 and 64. A pair of diodes 94 have their anodes connected to the lines 96 and 98 so as to ground these lines in the event they become positive with respect to ground.

The lines 96 and 98 are connected to the control grids 100 and 102 of gas-filled tubes 104 and 106, for example of 2050 type. The connections of these tubes may be now briefly described. The direct high voltage supply is connected to the anodes of the respective tubes through resistances 112 and 114, there being located between the anodes and ground the respective condensers 123 and 125. The proper normal biases are applied to the control grids of the tubes by raising the potentials of their cathodes above ground by connection to the pairs of resistances 116 and 117, and 118 and 119. Resistances 116 and 118 are adjustable. Examination of the gas tube circuits will reveal that they are so connected that, if nothing else were involved, they would pulse due to high resistances at 112 and 114 in conjunction with the condensers 123 and 125. If the signal amplifier input was short-circuited, adjustments at 116 and 118 could be made so that they would pulse simultaneously at approximately the same rate. Actually the theoretical pulsing frequencies are of no consequence since these tubes do not actually pulse as they might independently of signal input, though their operation is dependent upon the ability to so pulse. Assume a direction of pendulum displacement such that due to the phase detecting arrangement already described the tube 104 has applied to its grid a large negative bias so that it cannot fire. The grid of tube 106, however, is connected to the line 98 which is now substantially at ground potential and its grid has only a small negative bias with respect to its cathode so that this tube can pulse. As will be shortly evident the only pulse of any consequence in the pulsing period is the first one, from the standpoint of desired results.

Obviously, if the pendulum deviates from its null position in the opposite direction the tube 106 will be biased to an extent preventing pulsing while the tube 104 may pulse.

The outputs from the gas tube circuits are delivered from their anodes through the condensers 124 and 126. From these condensers extend the respective lines 120 and 122 which are connected to a flip-flop arrangement comprising a pair of triodes 132 and 134 having their anodes connected to a positive voltage supply through a balancing potentiometer and having their grids 129 and 131 respectively connected to the lines 120 and 122. Resistance-capacity networks 142 and 138 provide conventional criss-cross connections between the grids and the anodes 136 and 140. Cathode resistors 144 and 146 are provided. These and other connections of this flip-flop arrangement are conventional, the grids being connected through resistors 139 and 141 to a high negative biasing potential. The flip-flop characteristics are conventional in that it has only two stable states, with one or the other of the triode elements conducting. If a negative pulse is applied to the grid of the triode which is conducting at any instant a shift occurs resulting in the cutting off of the previously conducting triode and in the conductivity of the previously non-conducting triode. The effect of the connections to the gas tube pulsing system will now be clear. Firing of the tube 104, for example, will produce a negative pulse on the grid 129 through the condenser 124. If the tube 132 was conducting this negative pulse will drive it to cut-off condition and the tube 134 will become conductive. It will be evident that only the first of a series of pulses through the tube 104 will have any effect: once the first pulse produces cut-off of the tube 132 succeeding pulses will effect no change in the flip-flop circuit. A change in its stable state will occur only when a pulse is emitted from the tube 106, applied to the grid 131. It will be evident, therefore, that the tubes 132 and 134 become respectively conductive as the pendulum swings through its null position. Actually a slight time delay is involved which will be described in connection with a summary of the operation.

The restoring of the displaced pendulum is effected through the circuit comprising the triodes 152 and 154. The grids 148 and 150 of these triodes are respectively connected through the lines 128 and 130 to the grids 129 and 131 in the flip-flop circuit. Obviously, therefore, the grids of the triodes 152 and 154 have the same potentials as the grids 129 and 131 so that as the last mentioned grids are maintained, through particular periods, at cut-off potentials the same is true of the grids 148 and 150. Positive anode voltage is supplied to the triodes 152 and 154 through the balancing potentiometer 151 from a voltage regulating circuit comprising the triode 153 and the pentode 155. The respective cathodes of triodes 152 and 154 are connected in series with resistors 156 and 158 which are, in turn, connected to ground through the resistance 165. The control grid of pentode 155 is connected to the ungrounded end of resistor 165. As will be evident hereafter, the current through resistor 165 should be constant since one or the other of triodes 152 and 154 should always be conducting the same current while the other is cut off. Despite unavoidable changes in characteristics of these triodes, and despite variations in the pulses applied to the grids, the voltage regulating arrangement insures that, when conducting, both triodes have the same anode currents. To provide a rough check on the inclination angle and acceleration a microammeter 161 and series resistance 163 are connected to provide a voltmeter across the cathodes. Balance of the triodes is attained through adjustment of the contact of potentiometer 151 to cause the final differential counter to read zero when the inclination angle is zero.

The anodes of the triodes 152 and 154 are connected through the lines 160 and 162 to the terminals of the detector coil 2 so that a direct current will flow in the detector coil in proportion to the difference in potential between the anodes of the two triodes. As will be evident, this current will flow in one direction or the other depending upon which of the triodes 152 and 154 is conducting or not conducting, the connections being so made that this circuit always tends to restore the pendulum toward null position in accordance with the signal to which its deviation from null position gives rise. It may be here pointed out that while the high frequency signals are imposed on the lines 160 and 162 from the detector coil, one or the other of the triodes 152 and 154 is always cut off and the resistance at 151 is sufficiently high to prevent such short circuiting across lines 160 and 162 as would prevent the delivery of proper signals through condensers 43 to the phase detecting system. It is, therefore, not necessary to block the high frequency signals from the lines 160 and 162 by any filtering means.

Figure 10:
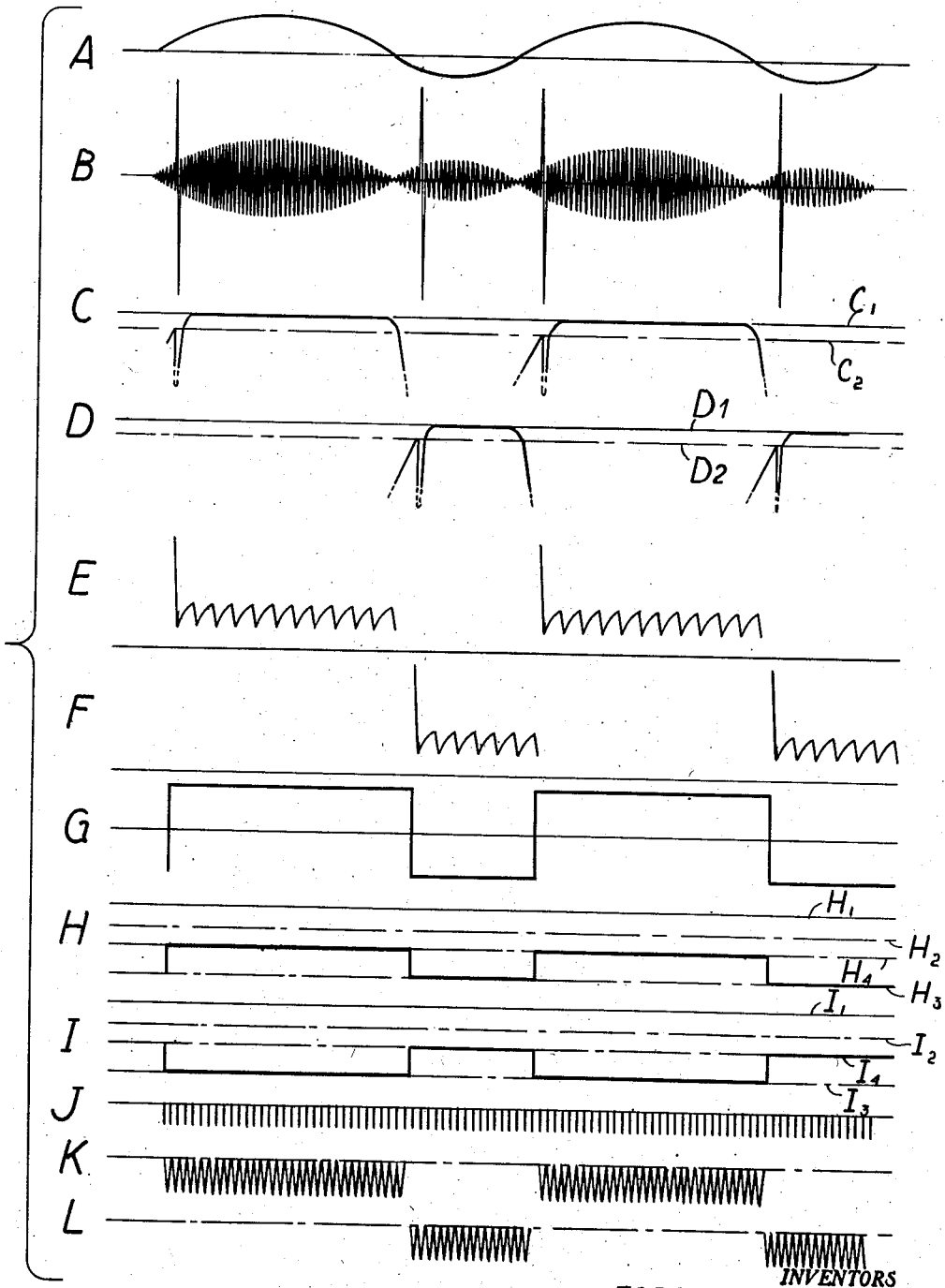
Figure 10 is a diagram illustrating the operations of various parts of the system.

The description so far covers those elements which control the pendulum operation and that may be now briefly summarized with references to Figure 10 which indicates typical variations with time of conditions in the apparatus. Assume that the pendulum deviates in one direction from perpendicularity to the roadway, i. e., from its null position, the term "null" being used in this sense herein. The pendulum deviations are indicated by the curve A in Figure 10, the axis representing the null position. This deviation prevents the firing of one of the gas tubes and the other starts pulsing. The signals produced by the deviations of the pendulum produce signals on the grid of tube 52 as indicated in curve B. These in turn produce signals on the grids of the respective gas tubes 104 and 106 as indicated in curves C and D. $C_1$ and $D_1$ represent, respectively, zero potential, relative to ground, of the grids which cannot become positive due to the limiting action of diodes 94. $C_2$ and $D_2$ indicate firing grid potentials. The transients pictured are briefly referred to hereafter. Their dotted portions indicate swings of potential very great compared with the full line portions of the curves. The resulting plate potentials of tubes 104 and 106, respectively, are indicated in curves E and F. The first pulse of a tube is of large magnitude, followed by succeeding pulses of less magnitude. As previously described the first pulse of a series will set the condition of the flip-flop and, by selective cutting off of one of the tubes 152 and 154, will give rise to a direct current in the pendulum coil tending to restore it to its null position by reaction with the field set up by the permanent magnets 14 and 16. The current through the pendulum coil is indicated at G. A negative bias builds up quickly after the pendulum has passed its null position since the charging time constants for the condensers 90 and 92 are small. The discharge time constants are relatively large so that there is a relatively slower decay of negative bias to the small negative value which permits the gas tube to fire. The time constant is adjusted so that firing occurs approximately as illustrated. Actually, these time constants are quite small but it will be evident that the operation is such that the pendulum will pass its midposition before being reversed. The result is that the pendulum can never come to rest but will be continuously oscillating about the null midposition. The fact that the pendulum cannot come to rest eliminates the possibility of existence of a dead zone of operation.

The frequency of the pendulum is determined by various factors including the amplifier gain, the value of the current applied to the pendulum coil and the strength of the direct magnetic field, the biases of the gas tubes, the time constants of the circuits 86, 90 and 88, 92, the damping forces on the pendulum, primarily those imposed by the liquid in which the pendulum is immersed, and additionally the amplitude of swing which is determined by the same parameters. The pendulum frequency is not constant. It can have a large amplitude of oscillation at low frequency or a small amplitude of oscillation at high frequency, the frequency changing as the pendulum assembly is tilted. The oscillating pendulum dissipates the energy supplied by the alternating square wave current which is fed to its coil.

The effects of transients produced by current reversals have not been heretofore mentioned, but while these transients have large components of signal frequency they are prevented from interfering in any way with operation of the circuit, since they appear as large negative pulses on the grids of the gas tubes but they occur after the gas tubes have decided in which direction to move the coil. However, though the effect of these transients is to prevent any further decision by the gas tubes for a short period of time, the motion of the pendulum is not altered by their presence because the decision of the tubes has already been made as just described. The method of operation adopted permits an extremely high gain amplifier to be used without the instability which usually results as amplifier gain is increased. The technique involved is of quite general application where transient disturbances are fed around a feedback loop. Tests have revealed that the system is entirely free from the usual instabilities encountered in amplifiers of this type.

For the purpose of indicating performance of the system certain typical conditions of operation may be cited. With a natural period of oscillation of the undamped pendulum of about three cycles per second, satisfactory operation has been found to exist with forced pendulum oscillation frequency in the neighborhood of thirty to seventy cycles per second with damping provided by a liquid in excess of the critical value for gravitational forces alone. Under such conditions the maximum normal displacements from the midposition of the pendulum are of the order of 0.1°. As indicated previously, the pendulum may be satisfactorily limited by stops 25 to prevent deviations of more than 1°. Adjustments can be readily made to secure oscillation frequencies up to the neighborhood of three hundred cycles per second with corresponding reductions in amplitude. However, these higher frequencies must be accompanied by sufficient oscillator frequency since at the higher frequencies of the oscillation of the pendulum individual cycles of excitation become important in determining the reversal points of the pendulum and this tends to lead to instability as the angle of inclination of the pendulum unit becomes large. It will be evident that all of the time constants in the system are quite small. In a typical arrangement which has been successfully used the pendulum signal amounts to about one volt per degree and the overall gain of the signal amplifier is approximately 4000.

For the purpose of securing records signals are taken from the cathodes of tubes 132 and 134 through the lines 170 and 172 which are connected to the respective grids 178 and 180 of the triodes 182 and 184. Curves H and I in Figure 10 indicate the grid potentials at 180 and 178, respectively, with respect to the cathode potentials. The lines $H_1$ and $I_1$ represent zero bias, $H_2$ and $I_2$ cut-off for the triodes, $H_3$ and $I_3$ the maximum bias values when the respective flip-flop triodes are non-conducting, and $H_4$ and $I_4$ the reduced bias values when the latter are conducting. The last bias values, it is to be noted, are beyond cut-off. A positive potential is applied to the anodes of triodes 182 and 184 through the load resistors 185 and 187 and a positive potential is also applied through the resistance 186 to the cathodes of these triodes, which cathodes are connected together and through a resistance 212 to ground. This arrangement is such that while in the absence of signals the anodes are positive with respect to the cathodes, the cathodes are at the same time so far positive with respect to the grids that the triodes are normally beyond cut-off. This cut-off condition even exists in the case of the one of these triodes which is connected to the conducting triode of the pair 132, 134. Briefly, anticipating a more complete description of operation, the arrangement is such that, if the cathodes are driven more negative during operation, that triode, the grid of which is connected to the non-conducting tube 132 or 134, nevertheless remains at cut-off condition; but the triode which has its grid connected to the conducting tube 132 or 134 becomes conductive by reason of the combination of more positive condition of its grid coincident with more negative condition of its cathode.

Pulses of a frequency corresponding to the velocity of the vehicle which carries the apparatus may be produced in various fashions of which that illustrated in Figure 1 is simple and wholly satisfactory. A shaft 193 which rotates at a speed proportional to the speed of the vehicle carries a disc 192 provided with rectangular radially arranged slots which chop the light passing from a lamp 194 to a photocell 195. The chopping rate here involved is subject to a wide range of choice but may be of the order of 1,000 to 20,000 cycles, or more, per second at 15 miles per hour velocity of the vehicle. The voltage wave which appears at the grid of a tube 196 is approximately triangular in form. The output from the tube 196 is taken off its cathode resistor and fed through a conventional amplifier 197 to give amplified pulses in the output line 198 which feeds the last stage tube 201 of the amplifying system. The anode of the tube 201 is fed a positive potential through the resistance 188 and the filter 207 which minimizes the transmission of pulses to the anodes of two triodes 200 and 202 which are fed a positive potential through the same resistance 188.

The triodes 200 and 202 are connected in a conventional Eccles-Jordan trigger circuit 205 by the criss-cross connections of the grids and anodes of these triodes through resistance-capacity networks 204 and 206. Signals are delivered to this trigger circuit through the condenser 203 and are delivered from it through the connection 208 and condenser 210 to the cathodes of the triodes 182 and 184. The operation of the trigger circuit is in accordance with conventional practice. A negative pulse delivered through the condenser 203 cuts off the triode 200 and renders conductive the triode 202. A negative pulse is thus produced through the condenser 210. The condenser 210 and resistance 212 provide a differentiating circuit with the result that a sharp narrow negative pulse is imposed on the cathodes of the triodes 182 and 184. The trigger circuit is reversed when a positive pulse is transmitted through the condenser 203. However, only the negative pulses produce an effect at the triodes 182 and 184 since only such negative pulses will result in driving the cathodes sufficiently negative to render conductive that triode the grid of which is more positive than the other due to conduction of the triode 132 or 134 to the cathode of which it is connected. The results may be summarized by stating that during a relatively long period of relatively positive grid potential one of the triodes 182 or 184 will conduct narrow pulses of current corresponding to each cycle generated by the operation of the disc 192. In any given period the frequency of these pulses will be directly proportional to the speed of the vehicle. The velocity pulses should be quite narrow as described relative to the pulses imposed on the grids 178 and 180 due to the swinging of the pendulum. If so, there is only a negligible loss of pulses due to coincidence with the shift of operation between the triodes 182 and 184. In a typical system it has been found, for example, that the gain or loss of pulses may be easily kept to less than 25 out of 200,000.

At J in Figure 10 there are indicated the differentiated negative pulses originating at the disc 192 which drive the cathodes of triodes 182 and 184 negative. As indicated, their amplitude is greater than the potential differences between $H_2$ and $H_4$ and between $I_2$ and $I_4$. The resulting potential variations of the anodes of triodes 184 and 182 are respectively indicated at K and L in which the plate supply potential is indicated by the chain lines.

The potential pulses which are respectively produced at the anodes of the triodes 182 and 184 are taken off through the lines 218 and 220 and condensers 222 and 224 to be counted. Condensers 189 and 191 are provided to broaden the output pulses to simplify and render more positive the operation of the counting system. For convenience of description the pulses through the line 218 will be described as positive elevation pulses and those through the line 220 as negative elevation pulses, it being understood that these terms refer not to the polarity of the pulses but rather to the directions of pendulum deviations which give rise to them. It may be noted that maintenance of precisely equal amplitudes of pulses on grids 178 and 180 or of constant amplitude of the cathode pulses is not of importance so long as the amplitudes are sufficient to cause triodes 182 and 184 to perform their gating functions.

At the frequencies indicated it will be evident that the elevation pulses follow each other in too rapid sequence for direct operation of mechanical counting means. Accordingly, they are scaled down by means of scaling circuits or counters indicated in Figure 1 at 226 and 228. The nature of these scaling circuits will be described hereafter. Essentially they involve giving rise to single output pulses for groups of input pulses, for example, in a ratio such as one output pulse for each 256 input pulses. The output pulses from these scaling circuits are delivered to a differential counter indicated generally at 230. Before proceeding with a detailed description of this differential counter there will be referred to certain mechanical connections, reference being made to Figure 7.

In order to minimize slippage on the roadway (which term is used herein to refer to any path traversible by the apparatus, not necessarily a well-defined road, but including cross-country lines of travel) so as to secure an accurate measurement of the length of path traversed, and in order to maintain conformity of parallelism of the base of the pendulum apparatus with the road surface there is preferably provided a trailer 233. This trailer comprises a rigid frame mounted on three wheels indicated at 234, 235 and 236. Spring mounting is desirably avoided to eliminate tilting errors to a maximum degree, the tilting due to the resilience of ordinary rubber vehicle tires being, however, negligible. The wheel 234 located at the mid-portion of one side of the trailer is normally fixed but is adjustable about a vertical axis relative to the frame of the trailer through the medium of an adjustable link 255 clamped in adjusted position by a pair of nuts. The other two wheels located at the front and rear of the other side of the vehicle frame are dirigible and interconnected. A vertical shaft 237 is connected to a towing bar 238 to be turned thereby and is connected through a parallel linkage indicated at 239 with the front wheel 235. The towing bar 238 provides a hitch to a motor driven truck which may carry the electrical portions of the apparatus under observation of an attendant. A vertical shaft 240 is connected through a parallel linkage 241 with the rear wheel 236. Pulleys carried by the vertical shafts 237 and 240 are connected by crossed steering cables 242 adjustable by means of turnbuckles 245, these steering cables being clamped to the pulleys at 243 and 244. The arrangement just described is such that as the towing bar 238 is angularly moved about a vertical axis, the vertical plane of the wheel 235 remains parallel thereto and the angle of this wheel with respect to the trailer frame is reproduced but in an opposite sense by the rear wheel 236 by reason of the cable connections. It will, accordingly, be evident that the axes of all three wheels if produced would intersect at a common point. The result is the securing of good tracking of the path followed by the trailer irrespective of banking of the roadway or other irregularities of the roadway causing it to deviate from a plane. The pendulum assembly is carried by the frame at 246 being arranged to be leveled by three adjusting screws. This leveling is accomplished when the trailer is located upon an accurately horizontal surface preparatory to the making of a survey. The rear wheel 236 is provided with a ring gear 248 driving a pinion 249 and through it flexible shafting forming a part of the shaft 193 previously described which drives the disc 192. The disc 192, the lamp 194, the photocell 195 and the tube 196 are located within a housing indicated at 247. Geared to the shaft 193 is another shaft 252 which drives a recorder chart as hereafter described to produce a displacement of the chart accurately proportional to the displacement of the trailer along its path. Also geared to the shaft 193 is a small alternating current generator 254 which will be hereafter referred to. This generator produces an alternating current, the frequency of which is proportional to the speed of displacement of the trailer along the roadway. The electrical connections from the apparatus on the trailer to that in the truck may be made through flexible cables, and the shaft 252 may be in part flexible since the recorder is preferably also in the truck. It may be remarked that all of the operating apparatus may be in the truck if desired if there is provided a Selsyn drive arrangement from the rear wheel 236 to reproduce in the truck the displacement of the rear wheel. It will be evident that this trailer may take various forms so long as it provides a proper mounting for the pendulum assembly, the housing of which must assume at all times the inclination of the roadway and so long as a wheel thereof provides an accurate measurement of the path traversed. A trailer accomplishes this result better than a power driven truck because such truck is liable to produce substantial errors of inclination and of tracking during changes of speed and under variations of roadway conditions which involve variable slippage.

Figure 8:
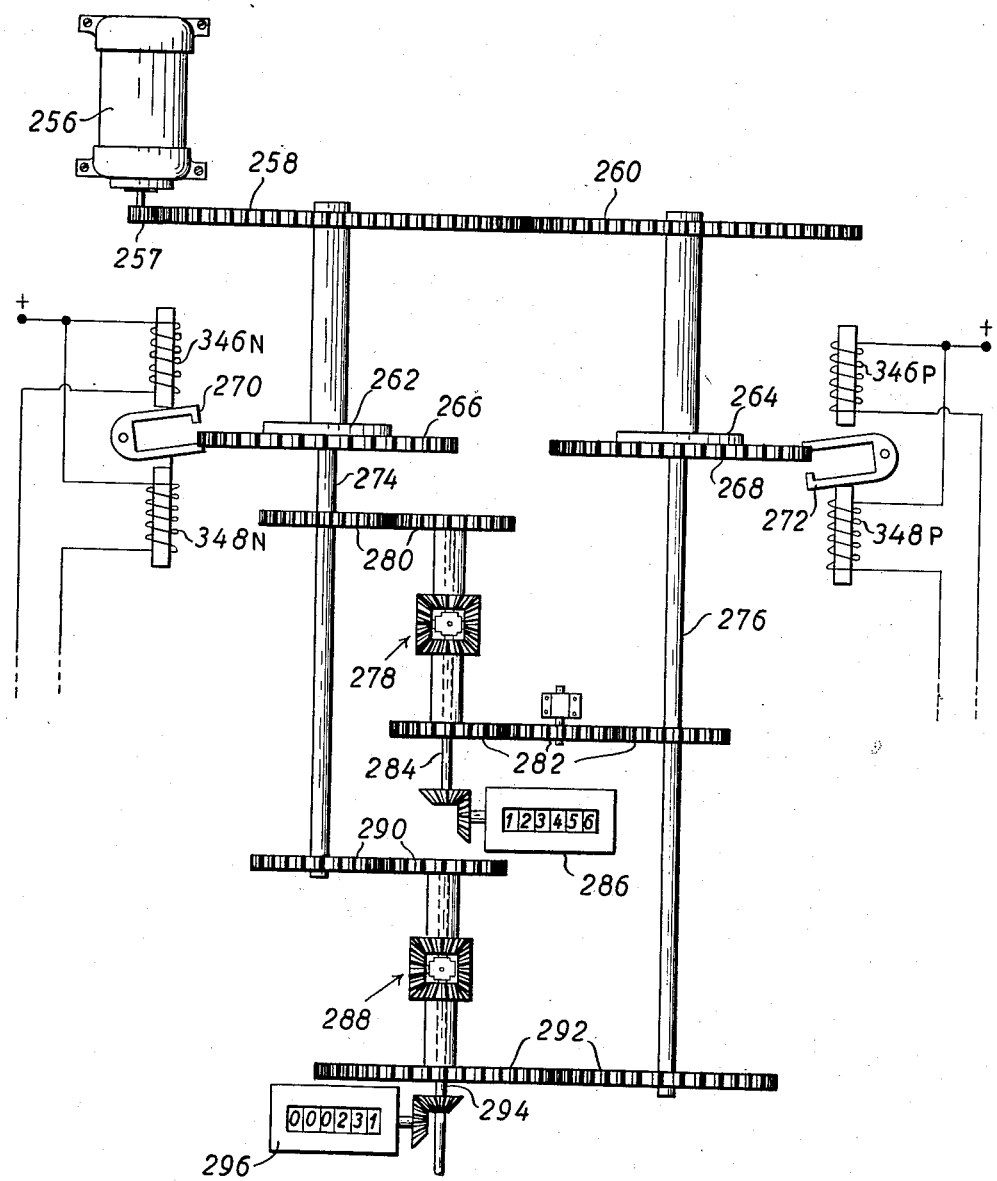
Figure 8 is a mechanical diagram showing a differential counting system.

Figure 8 illustrates the apparatus in the differential counter heretofore referred to as 230. A motor 256 through gearing 257, 258 and 260 drives a pair of friction discs 262 and 264 which in turn tend to drive ratchet wheels 266 and 268 at speeds in excess of maximum speeds permitted to them by the action of escapements 270 and 272. These escapements are operated in opposite directions through solenoids. Solenoids 346N and 348N control the escapement 270 and solenoids 346P and 348P control the escapement 272. These solenoids are respectively energized as will be described hereafter by the negative and positive scaling circuits 228 and 226. The shafts 274 and 276 connected to the ratchet wheels 266 and 268 drive a differential mechanism conventionalized at 278, the former through gearing 280 and the latter through gearing 282. The output shaft 284 of this differential mechanism drives a counter 286 which counts the sum of the pulses delivered by both scaling circuits.

The shafts 274 and 276 also drive through gearing 290 and 292 a second differential gear mechanism 288, the output shaft 294 of which drives a counter 296 which records the difference of the pulses delivered by the negative and positive scaling circuits. (It will be noted that there are three gears at 282 compared with two gears at 280 for producing the counting of the sum while two gears 290 and two gears 292 provide for the counting of the difference.) The shaft 252 (Figure 7) drives as indicated in Figure 1 a counter 298 which records, to a suitable scale, the displacement of the vehicle and accordingly the number of pulses produced by the slotted disc 192. As will be evident the counts of the counters 286 and 298, taking into account scaling differences, should theoretically agree, i. e., the sum of the pulses delivered through the lines 218 and 220 should be equal to the pulses produced by the slotted disc. Actually this is not precisely the case but there will be some loss in the number of pulses through the electrical system due to particular coincidence conditions as above mentioned. The two counters are provided in order that a check may be made of the validity of results since the difference in reading of these counters will indicate how many pulses have been lost and consequently will serve as a measure of proper operation and of the accuracy of the survey.

The reading of the difference counter 296, and in addition the difference of the counts indicated in the counters 226 and 228, as will be hereafter pointed out, is the measure of the change of elevation uncorrected for acceleration. It can be shown that by adding algebraically to the value given by the displacement of the shaft 294, i. e., the counter 296, a quantity proportional to $V^2$ the resulting measurement will be completely corrected for acceleration so that a chart may be caused to record continuously, while the vehicle is moving, the elevational difference which is encountered. This correction is exact for restored pendulum systems of the type described herein and is approximate for displaced pendulums for small angles of inclination. Of course, if the vehicle is brought to rest this correction disappears and the difference in elevation between two rest positions may be read directly from the counter 296 and indicating bulbs in the scaling circuits. A major advantage in using a restored pendulum system in contrast with a displaced pendulum system is that no acceleration compensation or correction is required if all readings are made with the vehicle at rest. Consequently if operation in this fashion alone is to be practiced, the acceleration correcting system may be omitted entirely.

Figure 7:
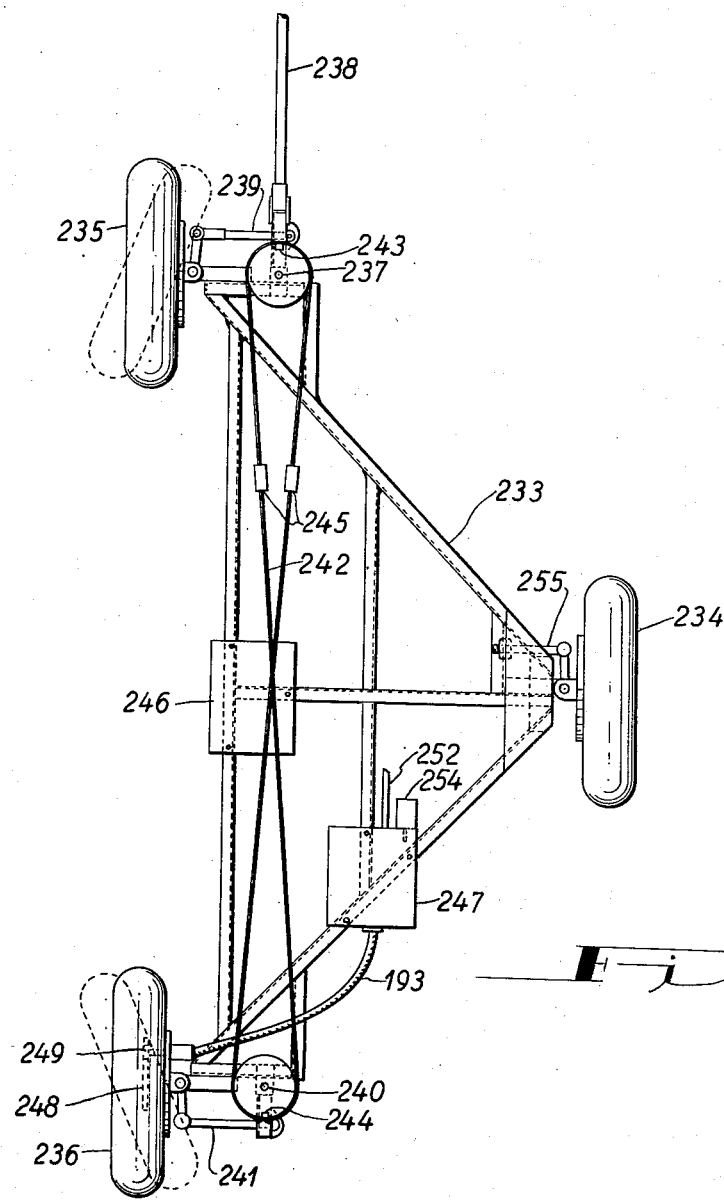
Figure 7 is a plan view showing a trailer used to support the pendulum and various other parts of the apparatus.

To secure the acceleration correction (or, as explained, the equivalent velocity correction) there is utilized the generator 254 previously described in connection with Figure 7 and shown in its electrical connections in Figure 1. The generator 254 is a conventional alternating current generator having permanent magnet poles. The output voltage is accordingly directly proportional to the speed of the vehicle since it is driven from the rear wheel and the speed may be read from an A. C. voltmeter 301 in series with a resistance 303 sufficiently high to prevent substantial current drain on the generator 254. The frequency of its output is also directly proportional to the speed of the vehicle. The generator feeds a series arrangement of a high resistance 304 and an inductance 302. Since the impedance of the inductance 302 varies directly as the frequency it will be evident that the alternating potential across this inductance will be directly proportional to the square of the velocity involved in the correction. A diode 306 and potentiometer resistance 308 together with a capacity 309 are connected across the inductance 302 to provide a direct potential on the grid of the tube 310, which potential is substantially proportional to the square of the velocity. The factor of proportionality may be adjusted by changing the position of the potentiometer contact. A second tube 316 is arranged in parallel with the tube 310 and the two tubes are provided with equal cathode resistors 313 and 315.

The shaft 294 of the differential counter (Figure 8) is connected (through reduction gearing, not indicated) to operate the movable contact 312 of a potentiometer 314 energized by a battery so as to vary the potential of the grid of the tube 316. The difference of potentials between the two cathodes taken off through the lines 317 and 318 serves to operate a conventional recorder 300, for example, of the Easterline-Angus type, the chart of which is driven from the shaft 252 so that a graph will be drawn, the abscissae of which is proportional to the road distance transversed and the ordinates of which will be proportional to the difference in elevation continuously corrected for velocity.

Figure 9:
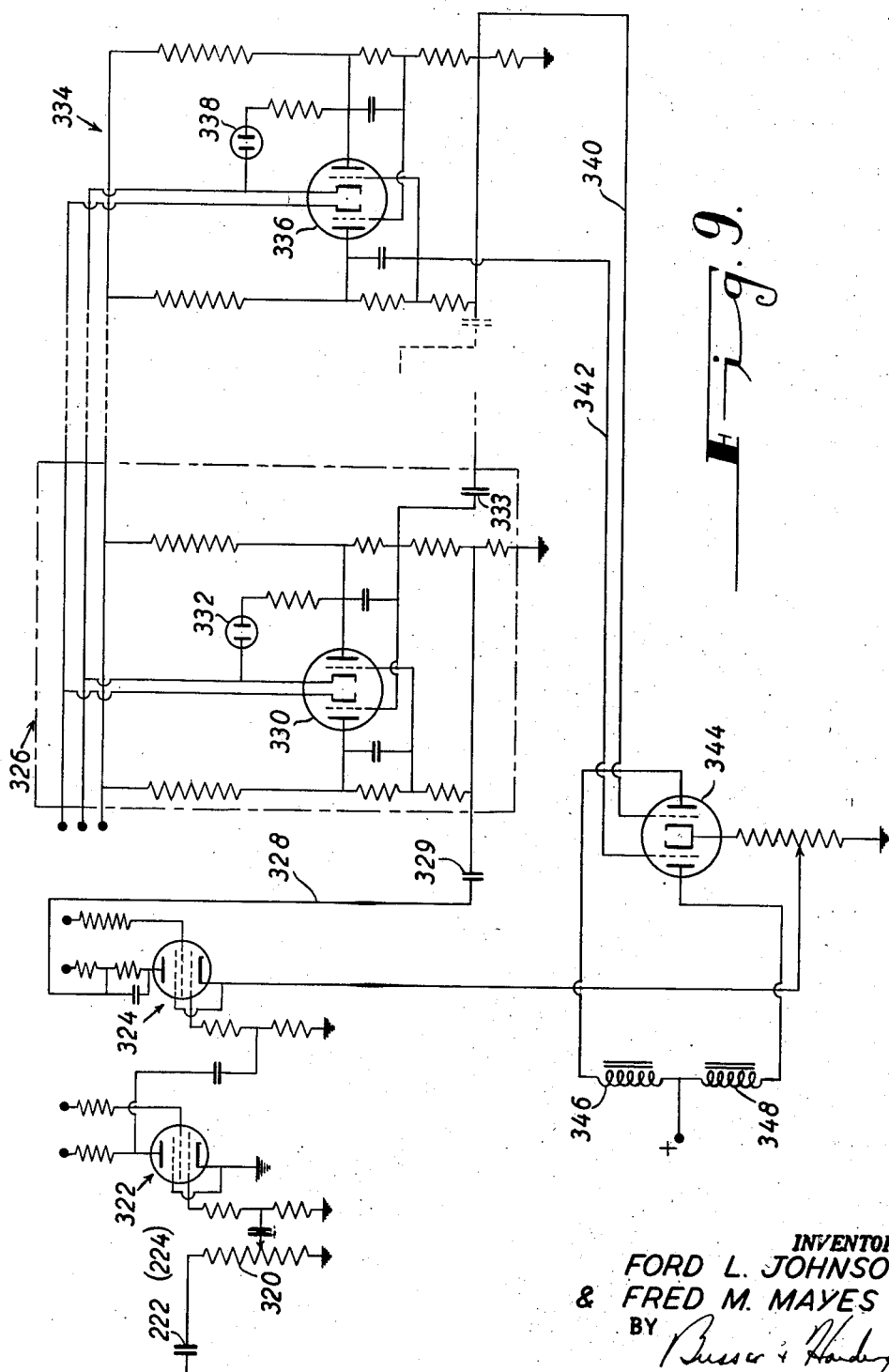
Figure 9 is a wiring diagram illustrating an electronic counter for the counting of pulses at high frequencies.

Figure 9 illustrates the type of scaling circuit which may be used at both 226 and 228. Since these may be identical Figure 9 will serve to illustrate both. The line from condenser 222 or from condenser 224 is connected to an attenuator 320 through which the pulses are delivered to the conventional amplifying stages 322 and 324, the amplified pulses being delivered through the line 328 and condenser 329. The counter comprises a series of identical stages only one of which is illustrated at 326, it being understood that this is followed by a series of similar stages completed by the last stage 334 to which output connections are made. Each of these stages scales down the pulses in a ratio of 2:1. It has been found convenient, with the frequencies described above, to provide eight of these stages to give a scaling ratio of 256:1. The elements of each scaling stage are quite conventional and require no particular special description. Each comprises a double triode 330 with a neon or similar lamp 332 provided in the stage to indicate the count represented thereby. The double triode of the last stage 334 is indicated at 336 and the neon tube therein is illustrated at 338.

These counters with somewhat more complicated interconnections may be made to scale in the decimal system rather than in the binary system but for present purposes the binary system is quite sufficient when due account is taken of the fact that the residual count represented by the illuminated neon tubes must be read in accordance therewith. At any instant the number of pulses may be accurately determined by reading the counter 296 in terms of multiples of 256 and adding to that reading the difference in digits represented by the neon lamps lit in the two scaling circuits.

The output from the last stage of each scaling circuit is taken through lines 340 and 342 to a push-pull amplifier arrangement 344 which serves for selective energizing of the solenoids 346 and 348, previously described, which operate the escapements.

The fact that the apparatus described measures changes in elevation to a high degree of accuracy may now be pointed out. The change in elevation taken over an arbitrary path is given by the integral between initial and terminal points of instantaneous velocity multiplied by the instantaneous sine of the angle of inclination of the path with respect to time. A close approximation to this integral can be easily shown to result if instead of the instantaneous value of the sine of the angle of inclination there is taken over small interval increments the statistical value of the sine of the angle of inclination such as might be determined by considering the average angle of inclination of a swinging pendulum with respect to a roadway and, if instead of an exact measure of instantaneous velocity, there is substituted the number of integral pulses per unit time statistically proportional to the velocity.

The tangential force or torque necessary to maintain a pendulum precisely perpendicular to a roadway which has a particular angle of slope is proportional to the sine of the angle of slope. Furthermore, if a pendulum is constrained to oscillate about such a position perpendicular to a roadway by the application of equal and opposite forces of constant magnitude applied through irregular intervals the net force, proportional to the differences in times of application of the two equal and opposite forces, will be proportional to the sine of the angle of inclination. The sine of the angle of inclination may accordingly be measured by measuring such differences in time of the application of the equal and opposite forces.

In curve G of Figure 10 the times of flow of pendulum current in one direction less the times of flow of equal current in the opposite direction would be such a measure of the sine of the angle of inclination. One type of statistical evaluation of the required integral could involve the measurement of these relative times over an extended time or space interval with multiplication then by a quantity proportional to the average velocity through that interval. It will be evident, however, that the same statistical result would be accomplished if there is counted during any interval of flow of pendulum current in one direction the number of pulses having a frequency proportional to velocity which are produced during that interval and algebraically summing such counts, calling them positive when pendulum current is flowing in one direction and negative when it is flowing in the other direction. It is in this last fashion that the statistical integration is accomplished in the present apparatus. Curves K and L of Figure 10 respectively show the number of pulses which are counted by the apparatus during pendulum current flow in one direction and the other. The difference of these counts is observed or recorded. It will be evident, and can be readily shown, that the statistical approximation becomes better and better as the frequency of reversal of the current through the pendulum is increased and as the number of pulses corresponding to a given velocity is increased. Under conditions such as stated heretofore the statistical measurement attains a high degree of accuracy with, for practical purposes, errors which are quite negligible. Errors do, of course, theoretically exist. The pendulum currents flowing in the two directions must be made equal to a considerable degree of accuracy. Changes of frequency of pulses proportional to velocity occurring during pulses of pendulum current flow will theoretically affect the accuracy, but actually with frequencies of pendulum oscillation such as stated the errors due to this cause are of a very low order of magnitude. Another error may arise in the system due to the loss of counts by coincidences of velocity pulses with change-overs in the direction of current flow. However, it is found in practice that these losses of counts are negligible if the velocity pulses applied to the cathodes of triodes 180 and 181 are kept very narrow in comparison with the width of the pulses of pendulum current. Furthermore, the apparatus provides a continuous check on this type of error by permitting the comparison of the reading of counter 298 with the reading of counter 236. The extent to which the readings of these counters correspond is a direct measure of the loss of counts.

It may be noted that a loss (or gain) of pulses does not contribute directly to an uncompensated error in the difference since the circuit can be so adjusted that the loss or gain is approximately equal for positive and negative pulses. So long as the fraction of pulses lost by the positive and negative counters remain constant, the error varies from no error at all to a fixed error which can be compensated by a drift correction.

While the invention has been described in connection with a type of apparatus in which it achieves special utility it may be pointed out that the invention is of very much broader scope. There is fundamentally involved the integration of the product of two functions with respect to an independent variable which, as will be evident in the foregoing, is measured in terms of time but may well be fundamentally another independent variable which, by transformation of the integral in the present case happens to be displacement. The principles of the invention are thus quite broadly applicable to the integration of the product (and, of course, by considering one function as the reciprocal of another function, of the quotient) of two functions. It is only necessary that one function be represented by a difference of time intervals (as represented by curve G of Figure 10) and that the other function be represented by pulses (as in curve J of Figure 10) with the provision of the equivalent of the system described to count the difference of the pulses occurring during respective intervals assigned positive and negative designations. As will be pointed out in discussion of further modifications, these results may be achieved in numerous ways, including those involving known equivalents of the various elements of the apparatus already described.

Aside from the matter of integration just discussed there may also be pointed out another aspect of invention involved in what has been described, namely, the measurement statistically of a force (or of a position or other quantity dependent on the force or on which the force may be said to be dependent) by producing in a statistical sense an average null position of a member displaceable by the force. The pendulum which has been described may be considered in this respect merely an example of a member subject to displacement by a force, in the present instance gravity. Such a displaceable element may be held to a mean position by the application of opposite forces applied periodically during unequal time intervals. As in the described apparatus these forces may impose on the member an unnatural period of oscillation about the mean position. The algebraic sum of the intervals of application of the opposed forces, exemplified by the curve G in Figure 10, will be a measure of the original displacing force or other variable quantity related to that force. If, for example, in the described apparatus the disc 192 were driven at a constant speed the number of counts in some unit interval would then always be proportional to such force or other related variable. The angle of inclination of a pendulum with respect to some datum line could thus by the present apparatus be remotely telemetered for any desired purposes.

Before proceeding with discussions of rather different embodiments of the invention reference may be made to modifications of the described apparatus typical of those which will readily occur to those skilled in the art. It will, of course, be evident that the supply of alternating current to the pendulum, described as accomplished by the oscillator 30, may be from any other equivalent generators, including other oscillators, light chopping devices, electromagnetic generators or the like. The detecting means for giving rise to a control potential upon the displacement of a pendulum or other force-displaceable device may take numerous forms of which the phase detector illustrated is merely an example, though, nevertheless, one to be preferred in view of its independence of amplitude of the signal with resulting simplification of the apparatus. The gas tube relay arrangement may be replaced by known equivalent relays of other types, including those employing high vacuum electron tubes, and conversely the flip-flop and other circuits giving rise to the required outputs may be replaced by many known equivalents, including circuits involving gas tubes. It is also evident that the long pulses represented by the pendulum current in the described arrangement may be broken up into shorter pulses so that the pendulum may be acted upon by a series of pulses in one direction and then a series of pulses in the opposite direction with consequent similar operations in other parts of the circuit. While for simplicity the opposing electromechanical forces may be best applied to the pendulum by reversal of current through the entire coil 2, it will be evident that this coil may be split so that current in one direction flows through one of its halves and current in the other direction flows through another of its halves. Or further, several separate coils may be wound on the pendulum, separating completely the restoring currents and/or the detecting and restoring currents. It will also be evident that the functions of the pendulum and field coils may be interchanged. Further, a gyroscope may be substituted for the pendulum. The function represented by velocity in the described apparatus may be transformed into equivalent pulses in very many other ways than that illustrated. The light chopping arrangement may be replaced by a generator having a frequency output dependent on speed, with suitable wave shaping devices of known type for the purpose of securing narrow pulses controllable by the longer pulses due to a second variable. The counting means is also susceptible to numerous changes among which may be cited reversible motors or motors of variable speed connected to differential mechanisms capable of giving not integral numbers of counts but rather continuous output displacements representing to a sufficient degree of accuracy the number of differential counts as herein described. The velocity correction may also be provided in numerous ways of which a centrifugal governor arrangement may be considered most obvious.

It may be noted that in a system of the general type described, as well as in systems hereafter described, particularly when extreme accuracy is not required, simplification, involving elimination of one scaling circuit, may be effected by counting pulses of only one type (positive or negative) and the sum of the pulses corresponding to those produced by disc 192, this latter count being accomplished, for example, by a counter such as 293. Under such conditions the difference $P-N$ of positive and negative pulses is secured as the sum $P+N$ minus $2P$ or $2N$.

Figure 11:
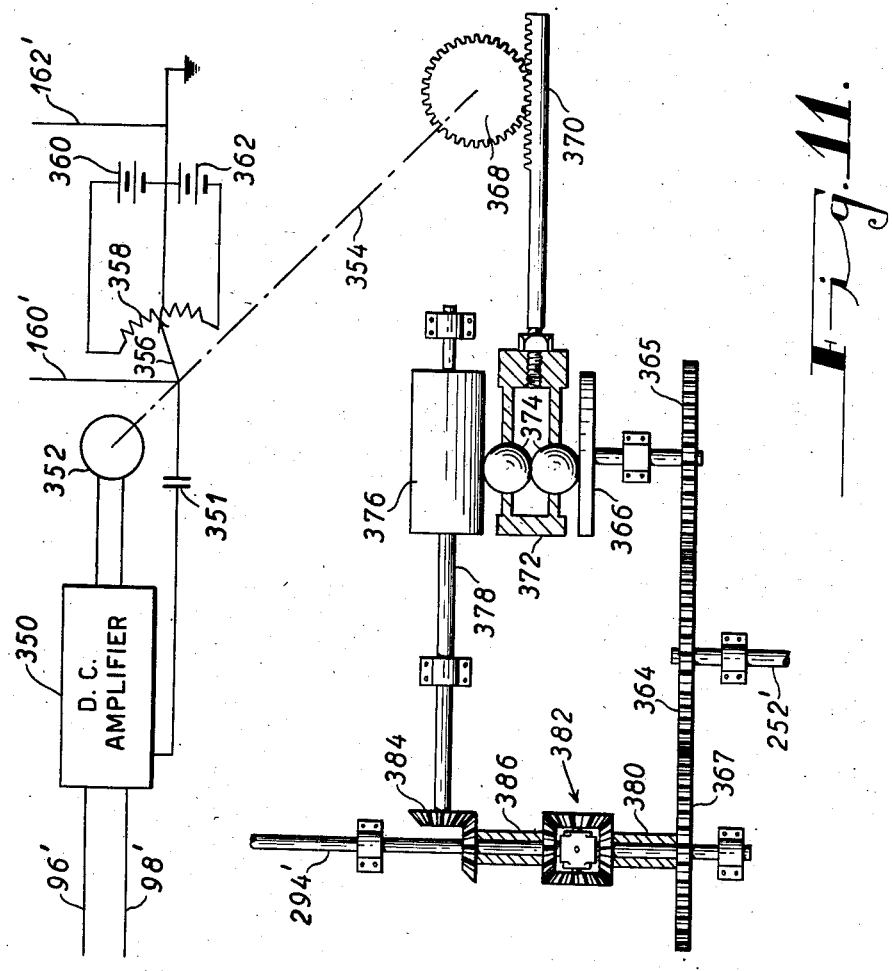
Figure 11 is a diagram, partially electrical and partially mechanical, showing a modification of the system of Figure 1.

Figure 11 indicates a modification of the invention in which feed back to the pendulum is provided in a different fashion than that heretofore described and in which the recording is also differently accomplished. To simplify the disclosure there are illustrated in comparison with Figure 1 only those elements which differ from equivalent counterparts in Figure 1. In various instances reference numerals are used corresponding to those in Figure 1 with the addition of primes.

The system of Figure 11 is similar to that of Figure 1 from the pendulum through the amplifying and phase detecting means with the result that direct potentials are produced in the lines 96' and 98' corresponding to 96 and 98, respectively, these potentials having signs depending upon the direction of deviation of the pendulum from a position normal to the roadway. The lines 96' and 98' feed a direct current amplifier 350 which serves to drive in reversing fashion a control motor 352. The direct current amplifier may be of any of various conventional types suitable for driving a motor 352 to secure a sufficient mechanical power output for purposes hereafter described. It may, for example, comprise a vacuum tube amplifier followed by an "Amplidyne" system of usual type, such as described in an article "Amplidyne" by John R. Williams in the May 1946, issue of "Electric Engineering." Alternatively, in any of the usual fashions the input may produce the driving of a reversible alternating current motor, the sole requirement being the amplification to a sufficient power level to drive a motor capable of quick reversal in accordance with the sign of the signal and with sufficient power to drive the mechanical elements of the apparatus. The particular characteristics of the motor, such as variable or constant speed characteristics or the like, are unimportant.

The shafting 354 of the motor which is conventionalized, since it may include reduction gearing or other mechanical transmission elements, drives the movable contact 356 of a potentiometer 358 energized as indicated by batteries 360 and 362 to provide feed-back current to the pendulum coil through the lines 160' and 162' corresponding respectively to 160 and 162 of Figure 1. Briefly stated, the motor 352 will follow in direction of movement the deviations of the pendulum from null position and by control of the potentiometer will cause a restoring current to flow in the pendulum coil. Hunting of the system may be reduced in any conventional fashion, for example, by a feed-back through the condenser 351 to the amplifier 350. Irrespective of the wave form of the pendulum restoring current (which will have a direct component and a sinuous alternating component), the average current through the pendulum coil will be proportional to the sine of the angle of inclination of the roadway; and the average position of the shaft 354 will also correspond linearly thereto, if, as is desirable to avoid the necessity for making corrections, the potentiometer provides an output potential linearly related to the position of the shaft.

The position of the shaft 354 is fed to a mechanical integrator which is also fed with the displacement along the roadway to produce the required integral representing the change of elevation. The shaft 252', corresponding to shaft 252 of Figures 1 and 7, drives through gearing 364 and 365 a disc 366. The shaft 354 drives a pinion 368 meshing with a rack 370 to which is secured a cage 372 in which are mounted balls 374 tightly engaging each other and, on one side the disc 366, and, on the other side, the cylinder 376 mounted on a shaft 378 the axis of which is perpendicular to, and passes through, the axis of the disc 366.

The gear 364 through a gear 367 drives the sleeve 380 providing one input to a differential gear arrangement 382. Bevel gears 384 and sleeve 386 provide a second input to the differential gear arrangement from the shaft 378. The output shaft 294' of the differential gear arrangement corresponds to the shaft 294 of Figure 1 and from that point on the apparatus is again the same as in Figure 1, including the velocity correction system and the recorder 300, the chart of which is driven from the shaft 252'.

The disc 366 of the integrator is driven from the shaft 252' at a speed proportional to the velocity of the vehicle. For zero inclination angle of the pendulum the ball followers 374 are adjusted at a disc radius to drive the drum 376 at the same speed as the input at 380 to the differential. Hence there is no rotation at this time of the shaft 294'. This differential arrangement is used to eliminate operation at or close to the center of the disc 374 which constitutes an inaccurate portion of the operating range of the integrator. The position of the balls 374 is proportional to the sine of the angle of inclination of the roadway and hence the rotation of the shaft 294' is proportional to the integral of the sine of the angle of inclination of the roadway with respect to displacement. The displacement of the shaft 294' may be calibrated in elevation uncorrected for velocity, which correction is achieved as in Figure 1 for continuous recording.

Figure 12:
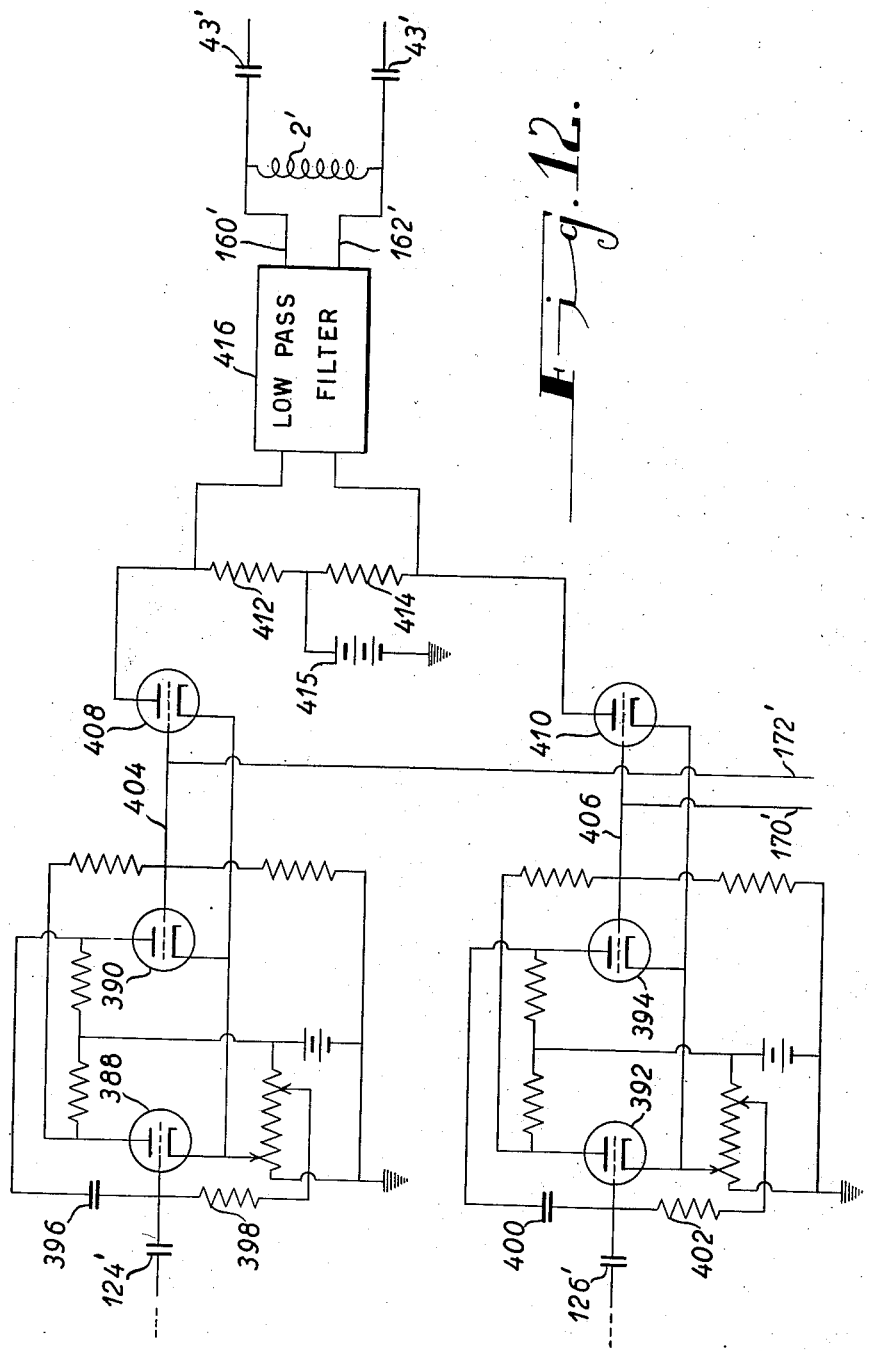
Figure 12 is a wiring diagram showing still another modification of the system of Figure 1.

As an illustration of the fashion in which pulse counting may be used to provide the value of an integral other than as disclosed in Figure 1, reference may be made to Figure 12 which shows a modification of a portion of Figure 1. The system now under discussion contains the same elements as Figure 1 from the pendulum coil, illustrated in Figure 12 at 2', through the condensers 43' corresponding to condensers 43 and the subsequent amplifying and phase detecting devices, including the thyratrons 104 and 106, through the condensers 124' and 126' corresponding to 124 and 126. Certain changes illustrated in Figure 12 are then involved up to the lines 170' and 172' corresponding to 170 and 172 and the lines 160' and 162' corresponding to lines 160 and 162 which provide feed-back current to the pendulum coil.

In the modification of Figure 1 the signals applied to the control grids of the thyratrons 104 and 106 were such that one or the other of these thyratrons would be cut off while the other was pulsing. For operation in accordance with the present system the thyratron biases are suitably adjusted and the amplifier gain is so reduced that the thyratrons are not cut off but rather both of them pulse continuously. Adjustment is initially made so that the two thyratrons pulse at equal rates when the pendulum is in null position. When the pendulum deviates from this position a more negative potential is applied to the corresponding one of the thyratrons and its pulse rate is decreased. This variation in pulse rate is caused to control the feed-back and the recording through the elements illustrated in Figure 12.

A pair of triodes 388 and 390 are connected to form a conventional rectangular pulse generator by criss-cross connections of their grids and anodes, including a condenser 396 and a resistor 398. This arrangement is connected to receive the sharp pulses from the condenser 124'. A similar circuit comprising the triodes 392 and 394 and connections including the condenser 400 and resistor 402 is connected to the condenser 126'.

The rectangular pulse generators are of a particular type which may be described by reference to the upper one. A narrow negative pulse delivered through the condenser 124' will cut off the triode 388 and render conductive the triode 390. Then this condition continues for a time depending upon the values of condenser 396 and resistance 398. At the end of this time a sharp reversal of conditions occurs, the triode 390 being cut off and the triode 388 being again rendered conductive, this last condition being maintained until another negative pulse is applied to the grid of triode 388 through the condenser 124'. The result is that positive rectangular pulses are delivered through connection 404 from the grid of triode 390 at a frequency corresponding to the frequency of negative pulses through the condenser 124' but of a constant width irrespective of this frequency. The average positive potential of the grid of tube 408 is thus dependent upon the frequency. Adjustments are originally so made that, considering the frequency of pulses through the condenser 124' when the pendulum is in null position the length of the rectangular pulses corresponding to conductivity of the triode 390 is such that this tube is conducting almost all of the time. All of the considerations just discussed apply equally to the lower rectangular generator.

The grid of the triode 390 is connected at 404 to the grid of the triode 408. Similarly, the grid of the triode 394 is connected to the grid of a triode 410. The anodes of the triodes 408 and 410 are connected through resistances 412 and 414 to a battery 415. A low pass filter 416 is connected to the anodes and serves to pass smoothed out, though varying, current to the pendulum coil 2' through connections 160' and 162'. In this case if the filter passes only extremely low frequencies the result is to apply to the pendulum what amounts to a slowly varying current maintaining the pendulum substantially "steady" in the vicinity of null position. In fact, even though pulses are fed to the pendulum, a substantially non-oscillating positioning of the pendulum may be secured, i. e., the pendulum would not pass through null. In effect it may be maintained substantially at null by repeated light blows. This result could be accomplished by a simple modification of Figure 12 involving causing a constant current to flow from a battery through the pendulum coil, this constant current being opposed by pulses in one direction only.

As in the case of the modification of Figure 1 the average feed-back current to the pendulum depends on the difference of the average values of what may be called positive and negative rectangular pulses. However, in contrast with Figure 1 in which these pulses were successive the pulses in the present modification are not successive but may overlap in a rather random fashion, as may be dictated by their different frequencies by their constant duration. Their algebraic difference is the current fed to the pendulum coil. These pulses are fed through the connections 170' and 172', corresponding to 170 and 172 in Figure 1, to a similar integrating system in which they are used for gating sharp pulses originating from the velocity input. Again the negative and positive scaling circuits receive groups of pulses to be counted but these groups are not successive as in the case of Figure 1 but also overlap as do the rectangular waves to which they correspond. Nevertheless, it will be evident that the difference between the positive and negative resulting pulses will represent the change of elevation as previously discussed. One difference may be noted; the sum of the positive and negative pulses is no longer significant in indicating the proper operation of the apparatus by corresponding with the displacement along the roadway.

In distinguishing between the modifications of Figure 1 and Figure 12 reference was made, for simplicity of description, to the condition in connection with the latter that both thyratrons would pulse continuously. It may now be pointed out that this is not a necessary requirement: the thyratrons may pulse simultaneously or under some conditions of considerable pendulum deviation one or the other may cease pulsing. In any event, at least one of the thyratrons is pulsing at all times. It will be evident that proper operation will nevertheless occur under these last conditions, the difference between the ultimate positive and negative pulses representing the change in elevation.

The purpose of the low pass filter 416 is to remove the high frequency components of the pulse current to prevent transient disturbances at the grids of the thyratrons.

The system of Figure 12 will illustrate a rather broad class of equivalent devices which may be provided in accordance with the use of elements well known in the art. The variable frequency rectangular waves may, of course, be produced in accordance with practices well known in the art of frequency modulation utilizing variations in reactance tube modulators or the like for producing changes in frequency. It may also be pointed out that it is by no means necessary that the rectangular waves produced at connections 404 and 406 should be of constant and equal width so long as the changes in frequency which are involved will produce changes in average current. So long as the pulses are of constant amplitude their other characteristics are unimportant: positive and negative ultimate pulses corresponding in number to the durations of the first mentioned pulses will represent, by their numerical difference, change of elevation.

Figure 13 illustrates a further modification of the system of Figure 1 which involves a somewhat different mode of operation which may be conveniently referred to as phase shift operation. An oscillator 422 provides a sinusoidal wave through the condensers 43″ and the transformer 44″ to the phase detecting network. The pendulum coil 2″ is, as in Figure 1, fed with a high frequency from an oscillator 30 by induction from a field coil as it deviates from null position. The connections 160″ and 162″ introduce direct reversible feed-back in correspondence with 160 and 162.

In the case of operation with the oscillator 422 the current from this oscillator forces oscillations of the pendulum coil and hence modifies the signals applied to the control grids of the thyratrons from the phase detecting circuit. Accordingly, firing takes place, shifted in phase with respect to the signals from the oscillator 422, with operation otherwise similar to that of Figure 1. The advantage of this system is better control of the pendulum frequency.

An operation involving similar phase shift may be secured in numerous other fashions. Figure 14 illustrates another mode of accomplishing this result. In this figure elements corresponding to those in Figure 1 are designated by corresponding numerals with double primes affixed. The sinusoidal output from the oscillator 424 is in this case applied to the cathodes of the thyratrons 104″ and 106″ with resulting phase shift control of the firing of these tubes with results similar to those previously outlined.

In the several systems heretofore discussed it is to be noted that balanced arrangements are provided for reversing the feed-back current flow through the pendulum coil, for example the double arrangements of thyratrons or, in Figure 11, the centered potentiometer arrangement at 358. Such arrangements are desirable for simplification of balancing of the circuits but it will be evident that single-ended systems may be equally well used in all of the above described arrangements if a constant current is provided in one direction through the pendulum coil and the controlling feed-back system is arranged to reverse this current to secure an average current through the pendulum coil which will result in its maintenance, on the average, at its null position. In such case one set of groups of pulses to be counted will be delivered when the constant current is bucked and the other set when it is not bucked. In general, however, effective positive and negative pulses are applied to the pendulum defining periods for the respective counting of positive and negative sets of velocity or displacement pulses.

It is possible to provide as further alternatives methods which involve interchanging the functions of the velocity signal and the feed-back signal for the purposes of performing differential coincidence counting. For example, in one type of operation in accordance with Figure 12 the feedback current was derived from pulses of equal amplitude and length. Obviously, in that case the information concerning the sine of the angle of inclination of the roadway was contained in the frequency of the feed-back pulses so that sharp pulses derived from these could have been used in the counting. Figure 15 represents a system, in the way of modification of Figure 1, which embodies the reversal of operation which has just been indicated. An amplifier 197‴ corresponding to 197 of Figure 1 receives pulses at a frequency proportional to velocity from a disc and photocell arrangement such as illustrated in Figure 1. The amplifier controls an Eccles-Jordan circuit 426 of conventional type with the resulting output of a rectangular wave having variable width pulses. These are fed to the differentiating system consisting of condenser 428 and resistance 430 giving rise to sharp pulses of opposite polarities which are rectified by the diode 432 to pass through the condenser 434 pulses of single negative polarity having a frequency corresponding to the frequency of interruption of the light beam by the disc 192. The pulses delivered through the condenser 434 are fed to a rectangular pulse generator of the type previously described in connection with Figure 12 and comprising triodes 436 and 438 interconnected in a circuit including the condenser 435 and resistor 437 to give positive pulses at the connection 440 from the cathode of triode 438 which are at the frequency of interruption of the light beam by the disc 192 and are of constant amplitude and constant width. These pulses are delivered to the grids of triodes 442 and 444, the cathodes of which receive pulses through the condensers 124''' and 126''' from the anodes of the thyratrons 104 and 106 which, as described in connection with Figure 12, pulse at different frequencies. The connections from the condensers 124''' and 126''' are through 446 and 448 to the cathodes which are provided with resistors 450 and 452. In this case the constants of the thyratron circuits are chosen so that the frequencies of these pulses are much higher than the frequencies of the pulses in the connection 440. The operation of the triodes 442 and 444 is essentially similar to the operation of the triodes 182 and 184 and there are delivered through the condensers 222''' and 224''' connected to their anodes groups of positive and negative pulses through scaling circuits and a differential counter as in Figure 1. The pulses from the condensers 124''' and 126''' are also delivered through connections 454 and 456 to rectangular pulse generators of the type illustrated in Figure 12 giving rise to pulses of equal duration and amplitude to provide feed-back currents to the pendulum. It will be evident that the system just described will perform the integration necessary to secure the desired measurement of change of elevation.

What we claim and desire to protect by Letters Patent is:

1. In combination, a movable element, a reference member, said movable element being subject to a variable force tending to displace it from a predetermined position relative to said reference member, means producing a signal in response to such displacement of said element, means controlled by said signal producing two sets of pulses the difference of duration of which is a function of said variable force, means generating a third set of pulses of variable frequency, means producing a signal in response to coincidences of pulses of the third set with pulses of one of the first mentioned sets, means producing a signal in response to coincidences of pulses of the third set with pulses of the other of the first mentioned sets, and means receiving the last pair of signals and producing an output giving a measure of the difference of the two sets of coincidences.

2. In combination, a movable element, a reference member, said movable element being subject to a variable force tending to displace it from a predetermined position relative to said reference member, means producing a signal in response to such displacement of said element, means controlled by said signal producing two sets of pulses the difference of duration of which is a function of said variable force, means generating a third set of pulses, means producing a signal in response to coincidences of pulses of the third set with pulses of one of the first mentioned sets, means producing a signal in response to coincidences of pulses of the third set with pulses of the other of the first mentioned sets, and means receiving the last pair of signals and producing an output giving a measure of the difference of the two sets of coincidences.

3. In combination, means generating two sets of pulses the difference of duration of which, integrated over short intervals, is algebraically proportional to the value of one variable, means generating a third set of pulses the frequency of which within corresponding short intervals, is proportional to the value of a second variable, means producing a signal in response to coincidences of pulses of the third set with pulses of one of the first mentioned sets, means producing a signal in response to coincidences of pulses of the third set with pulses of the other of the first mentioned sets, and means receiving the last pair of signals and producing an output giving a measure of the difference of the two sets of coincidences.

4. In combination, means generating two sets of pulses the difference of duration of which, integrated over short intervals, is algebraically proportional to the value of one variable, said pulses alternating so that one or the other is substantially always existent, means generating a third set of pulses the frequency of which within corresponding short intervals, is proportional to the value of a second variable, means producing a signal in response to coincidences of pulses of the third set with pulses of one of the first mentioned sets, means producing a signal in response to coincidences of pulses of the third set with pulses of the other of the first mentioned sets, and means receiving the last pair of signals and producing an output giving a measure of the difference of the two sets of coincidences.

5. In combination, means generating two sets of pulses the difference of duration of which is algebraically proportional to the value of one variable, means generating a third set of pulses the frequency of which is proportional to the value of a second variable, means producing a signal in response to coincidences of pulses of the third set with pulses of one of the first mentioned sets, means producing a signal in response to coincidences of pulses of the third set with pulses of the other of the first mentioned sets, and means receiving the last pair of signals and producing an output giving a measure of the difference of the two sets of coincidences.

6. In combination, means for generating a set of pulses, means for establishing two sets of recurrent periods, means producing a signal in response to coincidences of pulses with the periods of one set, means producing a signal in response to coincidences of pulses with the periods of the other set, and means receiving the last pair of signals and producing an output giving a measure of the difference of the two groups of coincidences.

7. In combination, means for generating two sets of pulses, means for establishing a set of recurrent periods, means producing a signal in response to coincidences of pulses of one set with said periods, means producing a signal in response to coincidences of pulses of the other set with said periods, and means receiving the last pair of signals and producing an output giving a measure of the difference of the two groups of coincidences.

8. In combination, means for generating a set of pulses the frequency of which is proportional to the value of one variable, means for establishing two sets of alternate recurrent periods, the integrated difference of which is algebraically proportional to the value of a second variable, means producing a signal in response to coincidences of pulses with the periods of one set, means producing a signal in response to coincidences of pulses with the periods of the other set, and means receiving the last pair of signals and producing an output giving a measure of the difference of the two groups of coincidences.

9. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing electromechanical forces constraining said element to oscillate about said predetermined position, means producing an output in response to the displacement of the vehicle along the roadway, and integrating means having inputs from the last two mentioned means corresponding to said electromechanical forces and said displacement along the roadway to provide a measure of change of elevation of the roadway.

10. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing electromechanical forces tending to maintain the element substantially in said predetermined position, means for producing two sets of pulses the difference of duration of which, integrated over short intervals, is algebraically proportional to the average value of said electromechanical forces over similar intervals, means for producing a third set of pulses the frequency of which is proportional to the rate of displacement of the vehicle along the roadway, means for counting the coincidences of pulses of the third set with pulses of one of the first mentioned sets, means for counting the coincidences of pulses of the third set with pulses of the other of the first mentioned sets, and means for counting the difference of the two sets of coincidences.

11. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing oppositely acting electromechanical forces tending to maintain the element substantially in said predetermined position, means for producing two sets of signal pulses, the difference of duration of which, integrated over short intervals, is algebraically proportional to the average value of said electromechanical forces over similar intervals, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

12. In combination, a vehicle adapted to traverse a roadway and assume continuously the inclination thereof, a pendulum element subject to gravity tending to displace it from a predetermined position relativie to said vehicle, means producing a signal in response to such displacement of said element, means controlled by said signal for producing oppositely acting electromechanical forces, in the form of pulses of substantially constant amplitude but of variable duration, tending to maintain the element substantially in said predetermined position, means for producing two sets of signal pulses the difference of duration of which, integrated over short intervals, is algebraically proportional to the average value of said electromechanical forces over similar intervals, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

13. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing oppositely acting electromechanical forces, in the form of pulses of substantially constant amplitude but of variable frequency, tending to maintain the element substantially in said predetermined position, means for producing two sets of signal pulses the difference of duration of which, integrated over short intervals, is algebraically proportional to the average value of said electromechanical forces over similar intervals, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

14. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing oppositely acting electromechanical forces, in the form of pulses of substantially constant amplitude and duration but of variable frequency, tending to maintain the element substantially in said predetermined position, means for producing two sets of signal pulses the difference of duration of which, integrated over short intervals, is algebraically proportional to the average value of said electromechanical forces over similar intervals, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

15. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing two sets of oppositely acting electromechanical force pulses of substantially constant and equal amplitude tending to maintain the element substantially in said predetermined position, means for producing two sets of signal pulses the difference of duration of which, integrated over short intervals, is algebraically proportional to the average value of said electromechanical forces over similar intervals, the pulses of one of said sets of signal pulses corresponding in duration to the pulses of one of said sets of force pulses, and the pulses of the other of said sets of signal pulses corresponding in duration to the pulses of the other of said sets of force pulses, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

16. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing oppositely acting electromechanical forces constraining said element to oscillate about said predetermined position, means for producing two sets of signal pulses the difference of duration of which, integrated over short intervals, is algebraically proportional to the average value of said electromechanical forces over similar intervals, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

17. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing oppositely acting electromechanical forces, in the form of pulses of substantially constant amplitude but of variable duration, constraining said element to oscillate about said predetermined position, means for producing two sets of signal pulses the difference of duration of which, integrated over short intervals, is algebraically proportional to the average value of said electromechanical forces over similar intervals, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

18. In combination, a vehicle adapted to traverse a roadway and assume continuously the inclination thereof, a pendulum element subject to gravity tending to displace it from a predetermined position relative to said vehicle, means producing a signal in response to such displacement of said element, means controlled by said signal producing oppositely acting electromechanical forces, in the form of pulses of substantially constant amplitude but of variable frequency, constraining said element to oscillate about said predetermined position, means for producing two sets of signal pulses the difference of duration of which, integrated over short intervals, is algebraically proportional to the average value of said electromechanical forces over similar intervals, means for producing a third set of signal pulses the frequency of which is proportional to the rate of displacement of the vehicle along the roadway, means for counting the coincidences of signal pulses of the third set with signal pulses of one of the first mentioned sets, means for counting the coincidences of signal pulses of the third set with signal pulses of the other of the first mentioned sets, and means for counting the difference of the two sets of coincidences.

19. In combination, a movable element, a reference member, said movable element being subject to a variable force tending to displace it from a predetermined position relative to said reference member, a displacement detector producing a signal in response to such displacement of said element, and a feed-back system governed by said signal for maintaining said element in continuous oscillation at said predetermined position, said feed-back system comprising elements translating said signal into oppositely acting non-coextensive forces on said element averaging to balance said variable force.

20. In combination, a movable element, a reference member, said movable element being subject to a variable force tending to displace it from a predetermined position relative to said reference member, a displacement detector producing a signal in response to such displacement of said element, and a feed-back system governed by said signal for maintaining said element in continuous oscillation at said predetermined position, said feed-back system comprising a pulse generator translating said signal into oppositely acting non-coextensive force pulses, of substantially equal amplitude, on said element averaging to balance said variable force.

21. In combination, a movable element, a reference member, said movable element being subject to a variable force tending to displace it from a predetermined position relative to said reference member, a displacement detector producing a signal in response to such displacement of said element, and a feed-back system governed by said signal for maintaining said element in continuous oscillation at said predetermined position, said feed-back system comprising a pulse generator translating said signal into oppositely acting non-coextensive force pulses, of substantially equal amplitude, but of different duration, on said element averaging to balance said variable force.

22. In combination, a movable element, a reference member, said movable element being subject to a variable force tending to displace it from a predetermined position relative to said reference member, a displacement detector producing a signal in response to such displacement of said element, and a feed-back system governed by said signal for maintaining said element in continuous oscillation at said predetermined position, said feed-back system comprising a pulse generator translating said signal into oppositely acting non-coextensive force pulses, of substantially equal amplitude and duration, but of different frequencies, on said element averaging to balance said variable force.

23. In combination, a movable element, a reference member, said movable element being subject to a variable force tending to displace it from a predetermined position relative to said reference member, a displacement detector producing a signal in response to such displacement of said element, and a feed-back system governed by said signal for maintaining said element in continuous oscillation at said predetermined position, said feed-back system comprising a pulse generator translating said signal into oppositely acting non-coextensive force pulses, of substantially equal amplitude and frequency, but of different duration, on said element averaging to balance said variable force.

24. In combination, a movable element, a reference member, said movable element being subject to a variable force tending to displace it from a predetermined position relative to said reference member, a displacement detector producing a signal in response to such displacement of said element, and a feed-back system governed by said signal for restoring said element towards said predetermined position, said feed-back system comprising a pulse generator translating said signal into oppositely acting non-coextensive force pulses, of substantially equal amplitude, on said element averaging to balance said variable force.

25. In combination, a movable element, a reference member, said movable element being subject to a variable force tending to displace it from a predetermined position relative to said reference member, a displacement detector producing a signal in response to such displacement of said element, and a feed-back system governed by said signal for restoring said element towards said predetermined position, said feed-back system comprising a pulse generator translating said signal into oppositely acting non-coextensive rectangular force pulses on said element averaging to balance said variable force, the pulse generator giving rise to such force pulses acting in opposite directions alternately so that one or the other is substantially always acting on said element.

26. In combination, a movable element, a reference member, said movable element being subject to a variable force tending to displace it from a predetermined position relative to said reference member, a displacement detector producing a signal in response to such displacement of said element, and a pulse generator controlled by said signal to emit two sets of pulses the difference of duration of which averaged over short intervals is a measure of said variable force.

27. In combination, a movable element, a reference member, said movable element being subject to a variable force tending to displace it from a predetermined position relative to said reference member, a displacement detector producing a signal in response to such displacement of said element, a pulse generator controlled by said signal to emit two sets of substantially rectangular pulses of substantially equal amplitude the difference of which integrated over short intervals is a measure of said variable force, and an integrator receiving said pulses.

28. In combination, a movable element, a reference member, said movable element being subject to a variable force tending to displace it from a predetermined position relative to said reference member, a displacement detector producing a signal in response to such displacement of said element, a pulse generator controlled by said signal to emit two sets of pulses the difference of the frequency of which integrated over short intervals is a measure of said variable force, and an integrator receiving said pulses.

29. In combination, a pendulum element, a reference member having variable inclination, said element being subject to gravity tending to displace it from a predetermined position relative to said reference member as the reference member is inclined, a displacement detector producing a signal in response to such displacement of said element, a pulse generator controlled by said signal to emit two sets of pulses the difference of duration of which integrated over short intervals is proportional to the sine of the angle of inclination of said member, and an integrator receiving said pulses.

30. In combination, a pendulum element, a reference member having variable inclination, said element being subject to gravity tending to displace it from a predetermined position relative to said reference member as the reference member is inclined, a displacement detector producing a signal in response to such displacement of said element, a pulse generator controlled by said signal to emit two sets of pulses the difference of the frequency of which integrated over short intervals is proportional to the sine of the angle of inclination of said member, and an integrator receiving said pulses.

FORD LAWRENCE JOHNSON.
FRED M. MAYES.

References Cited in the file of this patent

UNITED STATES PATENTS

| Number | Name | Date |
| --- | --- | --- |
| 47,906 | Schou | May 23, 1865 |
| 481,432 | Soler | Aug. 23, 1892 |
| 536,906 | Aramburn | Apr. 2, 1895 |
| 844,982 | Widmeier | Feb. 19, 1907 |
| 1,621,856 | Sedgwick | Mar. 22, 1927 |
| 2,082,539 | Fischer | June 1, 1937 |
| 2,320,290 | McNatt | May 25, 1943 |
| 2,371,040 | Fisher et al. | Mar. 6, 1945 |
| 2,445,517 | Dilks | July 20, 1948 |
| 2,478,911 | Francis | Aug. 16, 1949 |